United States Patent
Misso et al.

[11] Patent Number: 5,627,701
[45] Date of Patent: May 6, 1997

[54] SKINNED FOAM CORE E-BLOCK

[76] Inventors: Nigel F. Misso, 1303 W. Park Ave., Riverton, Wyo. 82501-3260; Mark R. Scanlan, 4822 Rolling Hills Dr., Hartford, Wis. 53027

[21] Appl. No.: 274,543

[22] Filed: Jul. 13, 1994

[51] Int. Cl.⁶ .................. G11B 21/16; G11B 5/54
[52] U.S. Cl. ........................................... 360/106
[58] Field of Search ................ 360/97.01–98.01, 360/104–106; 369/215, 219–221, 244, 250

[56] References Cited

U.S. PATENT DOCUMENTS

| | | | |
|---|---|---|---|
| 4,553,183 | 11/1985 | Brown et al. | 360/97.02 |
| 5,097,978 | 3/1992 | Eckerd | 360/132 |
| 5,235,482 | 8/1993 | Schmitz | 360/97.02 |
| 5,301,078 | 4/1994 | Makino et al. | 360/106 |
| 5,452,151 | 9/1995 | Money et al. | 360/106 |
| 5,473,489 | 12/1995 | Sanada | 360/106 |
| 5,475,549 | 12/1995 | Marder et al. | 360/104 |
| 5,488,521 | 1/1996 | Lemke et al. | 360/97.02 |
| 5,523,912 | 6/1996 | Koriyama | 360/106 |
| 5,528,091 | 6/1996 | Loubier et al. | 360/106 |

FOREIGN PATENT DOCUMENTS

| | | | |
|---|---|---|---|
| 60-201578 | 10/1985 | Japan . | |
| 62-262280 | 11/1987 | Japan | 360/106 |
| 6-243604 | 9/1994 | Japan | 360/106 |

*Primary Examiner*—Jefferson Evans

[57] ABSTRACT

A skinned, foam core E-block assembly for a disk system for supporting a plurality of head arrays to write data to and/or retrieve data from tracks of a media disk. The E-block assembly is formed of a foam core material with a nonporous stressed skin that matches or exceeds the performance of currently used materials, at a lower cost. The foam may be ceramic, metallic, or polymeric. The skin is nonporous and may also be ceramic, metallic, or polymeric.

10 Claims, 5 Drawing Sheets

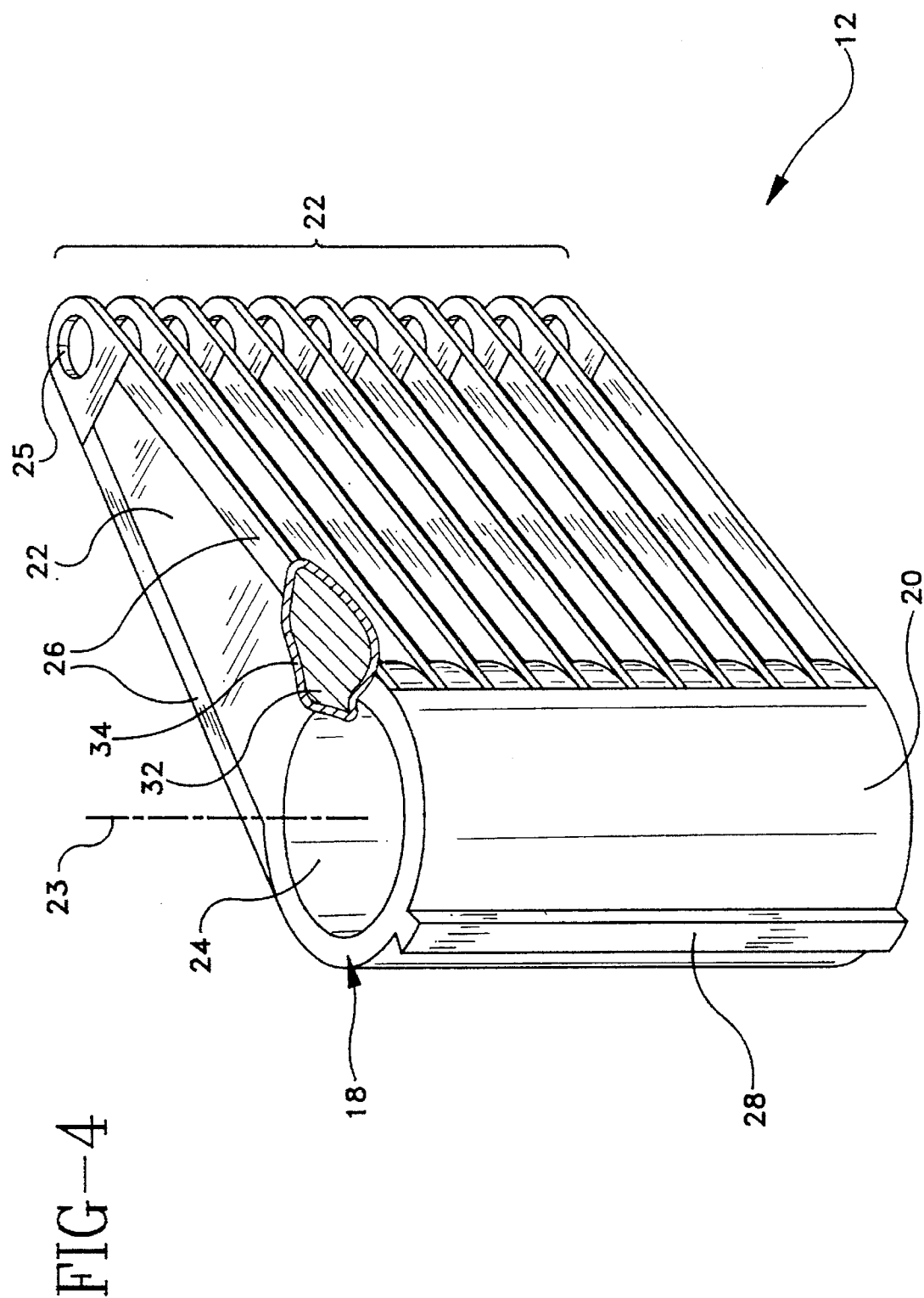

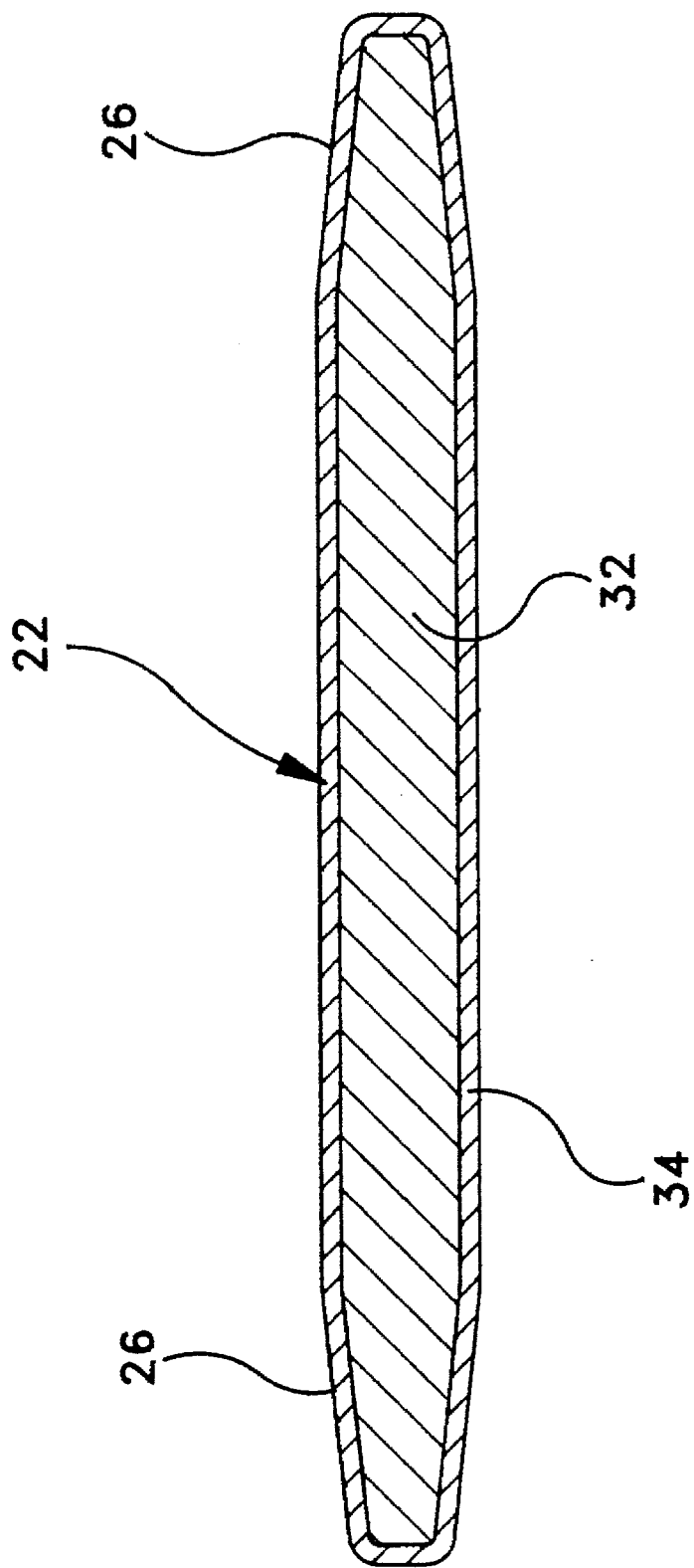

SKINNED FOAM CORE E-BLOCK

BACKGROUND OF THE INVENTION

The present invention relates to an E-block assembly in a disk drive system. More specifically, the present invention relates to an E-block assembly formed of a foam core with a non-porous stressed skin.

Hard disk drives (HDDs) are the data and program storage medium of choice for most of the computers used in the world today. A hard disk drive consists of an enclosure called the head-disk assembly (HDA), electronics, and means to mount the hard disk drive in the using system. The head-disk assembly includes a spindle with at least one media disk (magnetic or optical) on which data is stored in concentric tracks by means of data head assemblies which write and/or read coded data. While disk drives and the accompanying head-disk assemblies may use either magnetic or optical systems to record data, this application will discuss the present invention in the context of a magnetic disk drive. Of course, it is to be understood that many of the concepts discussed herein are equally applicable to an optical disk drive system.

In a magnetic disk drive, one or more magnetic disks are mounted on a spindle which rotates the disk(s) typically between 3000 and 7200 revolutions per minute while a magnetic read/write head (carried by a slider) "flies" over the surface of the rotating disk at an extremely small height (measurable in microns). As the disk rotates, the aerodynamic properties of the slider allow the head assembly to glide over the disk on a cushion of air. The head assemblies are flexibly attached to a rigid support arm which is part of an actuator that selectively locates the head assemblies over the disk surfaces.

There are two basic types of actuators: linear and rotary. A linear actuator positions the head assembly linearly along a radius of the disk. A rotary actuator, used in the vast majority of disk drives today, functions much like the tone-arm on a record player, with the actuator positioning the head assembly along an arc over the disk surface. A rotary actuator consists of several components: an E-block assembly, one or more head assemblies, and a flexible circuit to carry power and signals to and from the head assemblies. The E-block assembly includes an E-block, an actuator coil, a bore or other means for locating a bearing cartridge for allowing rotary movement of the E-block assembly, and means to attach and locate the required flexible circuitry. The focus of this invention is on the component referred to as an E-block assembly. Specifically, the invention relates to the construction and method of manufacture of E-block assemblies.

Disk drives and their various components are manufactured and marketed in a world wide market and may be considered commodity products. Thus, as is true for any commodity product, the cost of a disk drive system and its attendant components is a critical parameter in achieving sales of the product. The cost includes factors such as the raw component material, processing (forming, packaging, handling, etc.), recycling of scrap and process wastes, product development, testing, product life, and system performance. Minimizing the cost of a disk drive and its components, such as E-block assemblies, thus encompasses a wide range of design and manufacturing issues.

It is clear that the component's material and the method of producing the component have an effect on cost. Like all manufacturing decisions, the selection of material and method of manufacture requires a tradeoff of costs and advantages to obtain the desired product performance at the lowest cost possible. The parameters for selecting a material and method of manufacture for an E-block assembly in a disk drive can be grouped into three main areas:

1) material and finished product performance,
2) manufacturability, and
3) life expectancy.

In most instances, these parameters are optimized to improve the access performance of the disk drive. For example, power consumption may be minimized for a given access performance, or access performance may be maximized for a given power consumption.

For disk drive systems, it is desired to maximize the E-block assembly stiffness and minimize the system inertia, because increased stiffness and reduced motion result in improved access performance (i.e., faster access time and smaller power requirements). A stiffer system will respond faster, as greater stiffness minimizes "settle" time at the desired location. The faster a system "settles", the faster the head assembly can read or write data on the disk. A low inertia allows an E-block assembly, to be moved quickly from one location to another with a minimum of power consumption.

Several mechanical properties determine the stiffness and inertia of a system. These properties are material density, flexural modulus, and specific flexural modulus. A low material density is desired because a low density allows more material to be used to improve the stiffness of the E-block, while maintaining low mass (and thus low inertia). A low material density can reduce cost by eliminating the need for incorporating weight reducing holes into the product. Including weight reducing holes in an E-block requires additional manufacturing steps (such as machining of the component) which add additional costs. Further, the holes may induce air turbulence which effects the performance of the head assemblies as they "fly" over the surface of the disk.

A high flexural modulus (MPa), when combined with a low density (kg/m$^3$), produces a higher specific flexural modulus (m$^2$/s$^2$). Specific flexural modulus is related to the resonance frequency of a structure of a given size and shape, with a high specific flexural modulus indicating a high resonance frequency of the structure. A higher resonance frequency results in improved access performance of the E-block because the assembly may be moved faster without inducing resonance of the assembly. Resonance, or vibration of the assembly, increases "settle" time which, as discussed above, increases the time required before the head assemblies can read or write data to the disks.

Thermal stability of the E-block is also important in the performance of the disk drive system. As the temperature of a material changes, the material undergoes thermal distortion. In the case of an E-block, thermal distortion causes the arms of the E-block to move relative to a fixed reference point. This thermally induced movement affects the disk drive performance by altering the position of the head assemblies such that they may no longer be able to accurately read and write data to the disks. Ideally, the E-block would suffer no thermal distortion. The next best situation is to minimize the thermal distortion, and use a material that causes all the arms to return to their original positions when the thermal stress is removed. Thus, when selecting a material and method of manufacture for an E-block, the thermal stability of the material and affect of the method of manufacture on thermal distortion are important considerations.

In addition to selecting a material which optimizes the system performance, it is also desired that the component be easy to produce and have a life expectancy at least as long as the life of the assembled product. These three areas (i.e., performance, manufacturability, and life expectancy) each place specific demands on selection of material and method of manufacture. As noted above, to optimize the E-block assembly performance, the material properties relating to density, flexural modulus, specific flexural modulus, and thermal stability are important. For ease of manufacture, material properties such as ultimate strength, yield strength and tensile modulus are important, as well as the ability to assemble, bond, and machine the material. The life of the component is effected by the material's corrosion resistance and need for surface treatment, and in the case of an E-block assembly, the material's electrical conductivity. The importance of each of these factors is explained below.

An E-block assembly undergoes a significant amount of handling in transport during the manufacturing process. The component must be sufficiently strong to withstand the handling (and possible abuse) to which it is subjected. Therefore, the ultimate strength and yield strength of the material are important. Some materials used to form E-blocks may be functionally damaged in the manufacturing process without the damage being visible. For example, die cast magnesium has a very low yield strength (103 MPa), with a much higher ultimate strength (220 MPa). Thus a component made of die cast magnesium may yield (i.e., bend) a slight amount but not break. The result of a stress causing bending but not breakage is an unusable component with a defect which may not be detected until late in the manufacturing process, causing a greater manufacturing expense. To avoid this type of damage, a material with a high yield strength and an ultimate strength of essentially the same magnitude is desired. A high yield strength reduces the chance of accidental damage such as bending, while an ultimate strength close to the yield strength is more likely to produce visual evidence of damage. For example, if the yield strength and ultimate strength are equal (i.e., the material is perfectly brittle) any bending will result in a broken part which is easily detected and discarded early in the manufacturing process.

The tensile modulus of the material is important for attaching the head assemblies to the E-block support arms. Head assemblies are often attached by swaging, and it is desired that the E-block assembly material be compatible with the currently used manufacturing processes. For swaging, the material must deflect enough so that the head assembly can be plastically deflected to secure the head assembly to the support arm.

In addition to the above physical properties, it is desired that the material of the E-Block assembly be compatible with current adhesive bonding technologies. Many E-block assemblies have wires or other components bonded to the sides of each arm. The E-block assembly material must be chemically compatible with the chosen adhesives to prevent outgassing and/or corrosion which may damage the disk drive.

The interior of a disk drive is extremely sensitive to foreign materials, such as dust or other particulates. Thus, great care must be taken to ensure such debris is kept out of the disk drive. For metallic E-block assemblies, corrosion products are a significant source of particulates, and some form of surface treatment is required to prevent corrosion of the material. These surface treatments add cost to the finished product, and a product that does not require any special treatment is desirable.

The interior of a disk drive is an electrostatic generator of tremendous potential. When operating, the disks are rotating at a high speed inside a cavity full of dry (non-conducting) air. The rotation of the disks causes the air to rotate also, resulting in dry air moving across the actuator at high speeds. If the actuator and disk assembly are not adequately grounded, an electrostatic charge will build up, eventually dissipating through a circuit of the disk drive. The electrostatic charge may be of a magnitude large enough to destroy the circuit and also the disk drive. To prevent an electrostatic buildup, the material of E-block must be electrically conductive to properly ground the E-block assembly.

A need exists for an E-block assembly capable of exceeding current performance levels which is easy to manufacture at a low cost.

SUMMARY OF THE INVENTION

The present invention is a foam core E-block assembly with a non-porous stressed skin. The foam material may be ceramic, metallic, or polymeric. The skin material may be ceramic, metallic, or polymeric.

The present invention is an E-block that is compatible with today's requirements for disk drive actuators with substantially higher performance than the current state of the art. The use of a foam core which is less dense then currently used materials reduces the system mass and inertia, and improves system performance. The foam core supports a stressed skin which provides the strength and stiffness of the E-block. This is much like tubing.

BRIEF DESCRIPTION OF THE DRAWINGS

FIG. 4 is a perspective view of the unitary E-block of FIG. 2, with a cut away section showing the foam core and the non-porous stressed skin.

FIG. 5 is a section view through one of the arms, of the unitary E-block of FIG. 2, showing the foam core and the non-porous stressed skin.

DETAILED DESCRIPTION OF THE PREFERRED EMBODIMENTS

Figure 1:
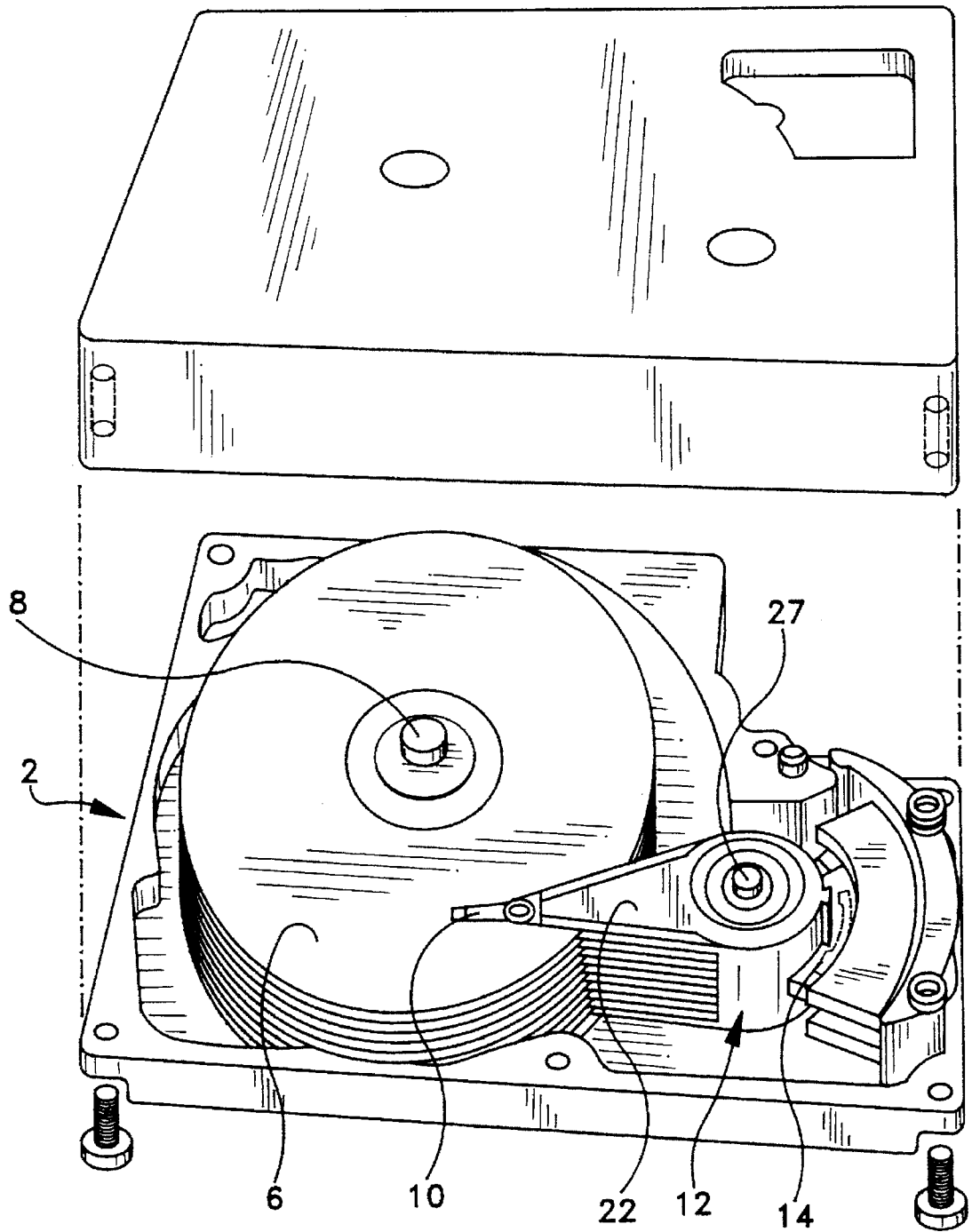
FIG. 1 is a perspective view of the head disk assembly of a disk drive system.
Figure 2:
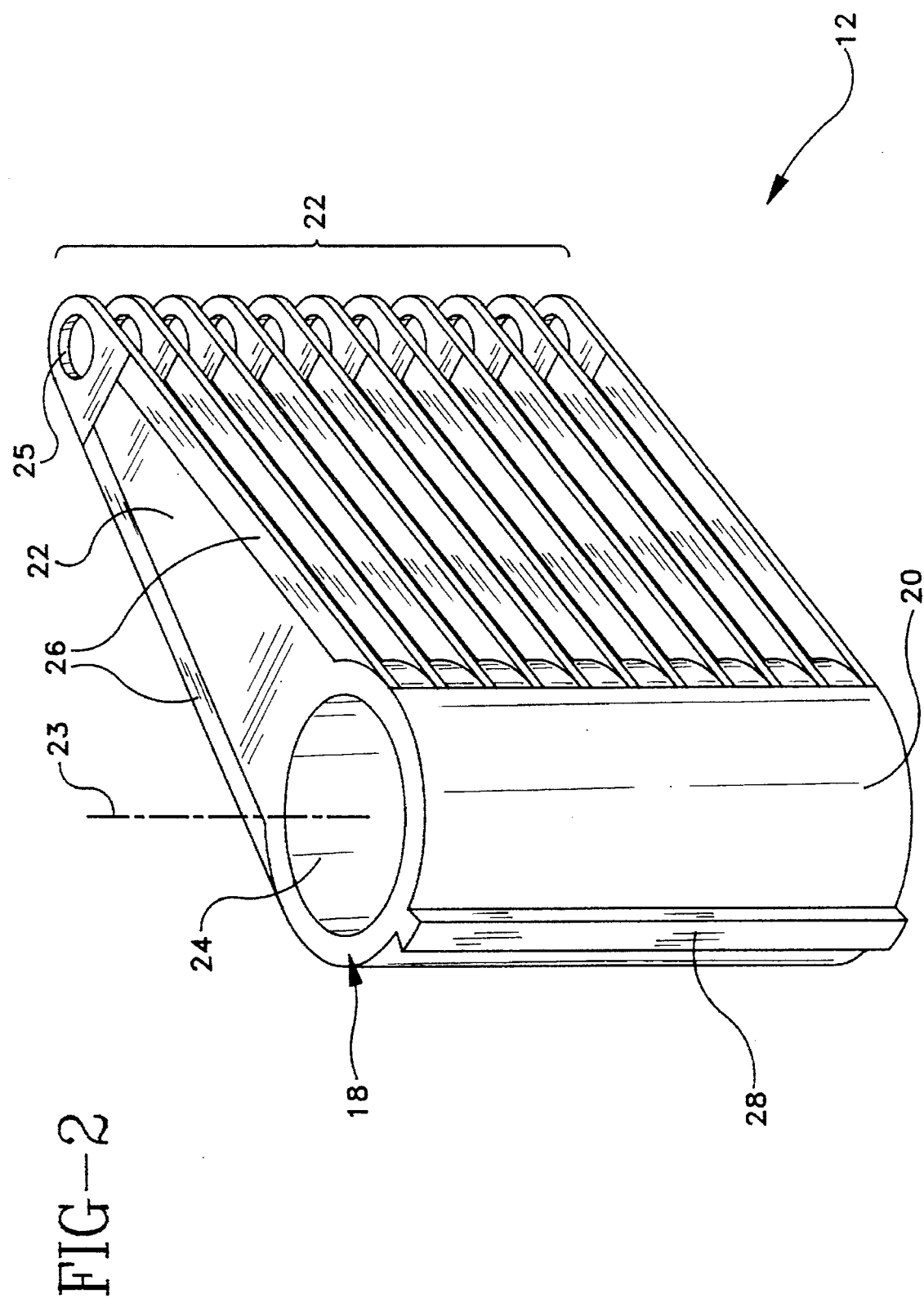
FIG. 2 is a perspective view of a unitary E-block with a plurality of support arms.
Figure 3:
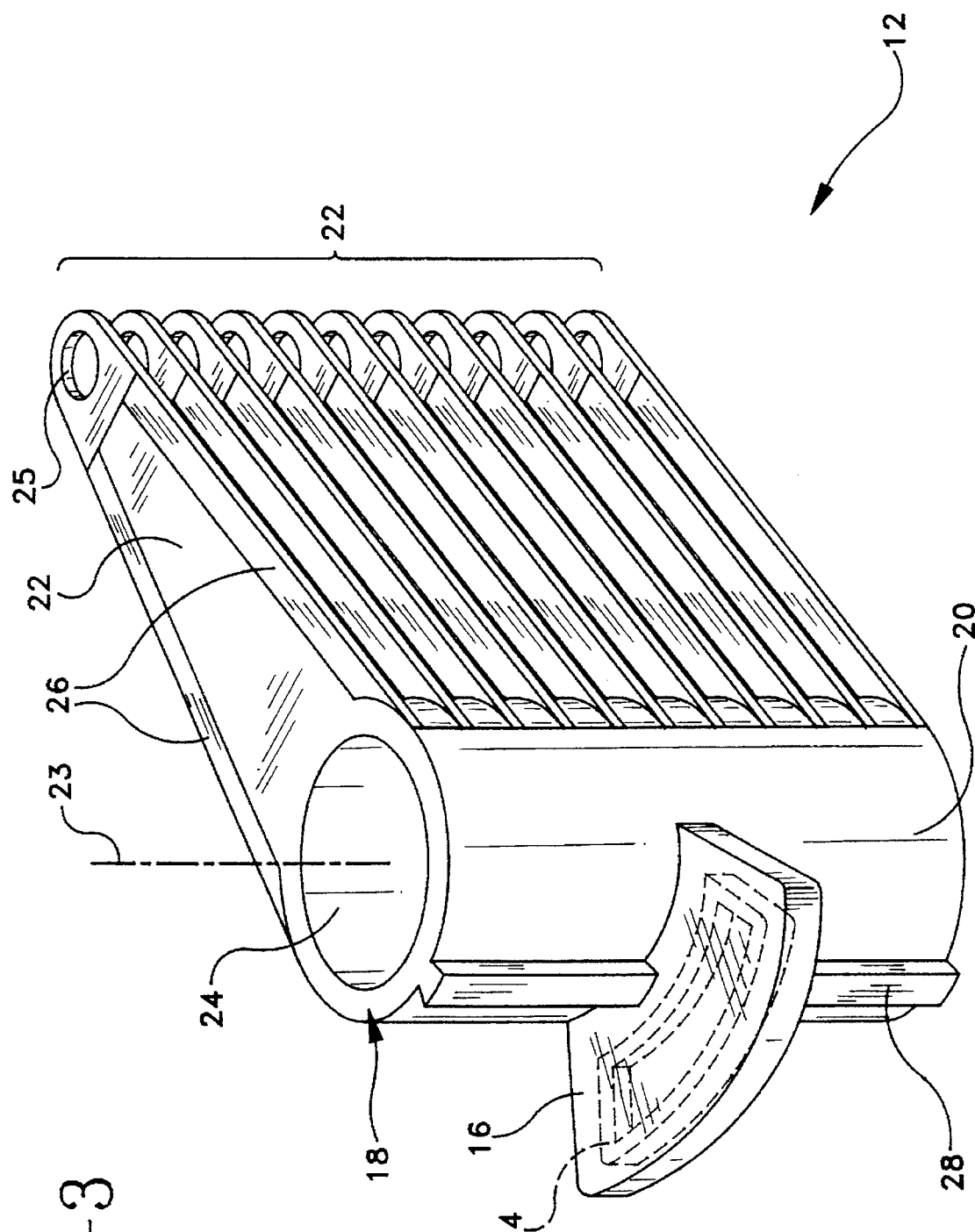
FIG. 3 is a perspective view of the unitary E-block of FIG. 2, with an actuator coil attached to the unitary E-block.

Referring to FIG. 1, a disk drive system 2 includes one or more media disks 6, mounted on a disk spindle 8. The media disks 6 hold encoded information which may be written and/or retrieved by head assemblies 10. Head assemblies 10 are positioned over the surfaces of media disks 6 by an E-block assembly 12. The E-block assembly 12 is capable of supporting a plurality of head assemblies 10 over the media disks 6 of the disk drive system 2 to write data to and/or retrieve data from tracks of the media disks 6. Referring to FIGS. 2 and 3, the E-block assembly 12 includes an actuator coil 14 (shown in broken lines) encased in an injection molded casing 16, and a unitary E-block 18. The unitary E-block 18 has an elongated body portion 20 and a plurality of support arms 22 extending from the body portion 20. The support arms 22 extend from the body portion 20 normal to an axis 23 of the body portion 20, with each arm 22 being capable of supporting at least one head assembly 10. The plurality of support arms 22 each include an attachment hole 25 for attaching the head assemblies 10 to support arms 22. The support arms 22 also include bevels 26 along the edges of the support arms for the purpose of weight reduction of the E-block assembly 12. Alternately, bevels 26 could be replaced by, or used in conjunction with, weight reducing holes (not shown) designed into the support arms 22. The body portion 20 includes along its axis 23 a central bore 24 for the placement of a spindle 27 for rotation of the E-Block assembly 12.

The E-block body portion 20 includes an anchoring means 28. The anchoring means 28 is a tenon used to secure the actuator coil 14 and its surrounding casing 16 to the body portion 20 of the unitary E-block 18. Although described as a tenon, the anchoring means 28 may be of any shape or design which securely and rigidly anchors the actuator coil 14 and accompanying casing 16 to the E-block 18.

Referring to FIG. 4, the unitary E-block 18 is made up of a foam core 32, with a solid non-porous stressed skin 34 completely surrounding the foam core 32. Referring to FIG. 5, a support arm 22 is made up of a foam core 32, with a solid non-porous stressed skin 34 completely surrounding the foam core 32. The foam core 32 may be made of ceramic, metallic, or polymeric material(s). For highest performance—greatest stiffness and strength—ceramic foam such as foamed Silicon-Carbide from Energy Research and Generation, Inc. of Oakland, Calif. is preferred. Metallic foams such aluminum, beryllium and magnesium from Energy Research and Generation, Inc. of Oakland, Calif., or Gasar materials from Dnepropetrovsk Metallurgical Institute in Ukraine, or other similar materials, may alternatively be used for the foam core 32. The solid non-porous stressed skin 34, is preferrably formed of the same base material as the foam core 32 to minimize thermal expansion mismatches.

What is claimed is:

1. An E-block assembly for supporting a plurality of head assemblies of a disk drive system to write data to and/or retrieve data from tracks of a media disk, the E-block assembly comprising:

an actuator coil;

a casing injection molded around the coil, the casing being formed of an electrically non-conductive polymeric material; and;

a unitary E-block rigidly mounted to the casing and constructed of a foam core with a non-porous stressed skin, the E-block having a pivoting portion having an axis and a plurality of arms extending from the pivoting portion normal to the axis, each arm being capable of supporting at least one head assembly at a free end thereof, the arms being uniformly constructed of a foam core completely surrounded by a non-porous stressed skin.

2. In a disk drive system for writing data to and retrieving data from tracks of a media disk, the disk drive system including a plurality of head assemblies for recording data to and/or retrieving data from tracks of a media disk, an E-block assembly comprising:

a unitary E-block rigidly mounted to the casing and constructed of a foam core with a non-porous stressed skin, the E-block having a pivoting portion having an axis and a plurality of arms extending from the pivoting portion normal to the axis, each arm being capable of supporting at least one head assembly at a free end thereof, the arms being uniformly constructed of a foam core completely surrounded by a non-porous stressed skin.

3. In the disk drive system of claim 2, wherein the E-block assembly further includes an actuator coil, a casing molded around the coil and rigidly mounted to the unitary E-block, the casing being formed of an electrically non-conductive polymeric material capable of being injection molded.

4. In the disk drive system of claim 2, wherein the E-block assembly further includes an actuator coil rigidly attached to the unitary E-block, the rigid attachment formed by adhesive, such as epoxy.

5. In the disk drive system of claim 2, wherein the foam and skin materials of the E-block are silicon carbide.

6. In the disk drive system of claim 2, wherein the foam and skin materials of the E-block are aluminum.

7. In the disk drive system of claim 2, wherein the foam and skin materials of the E-block are magnesium.

8. In the disk drive system of claim 2, wherein the foam and skin materials of the E-block are polyphenylene sulfide.

9. In the disk drive system of claim 2, wherein the foam and skin materials of the E-block are polyether imide.

10. In the disk drive system of claim 2, wherein the foam material of the E-block is carbon, and the skin material is a polymer.

* * * * *